Figure 1:
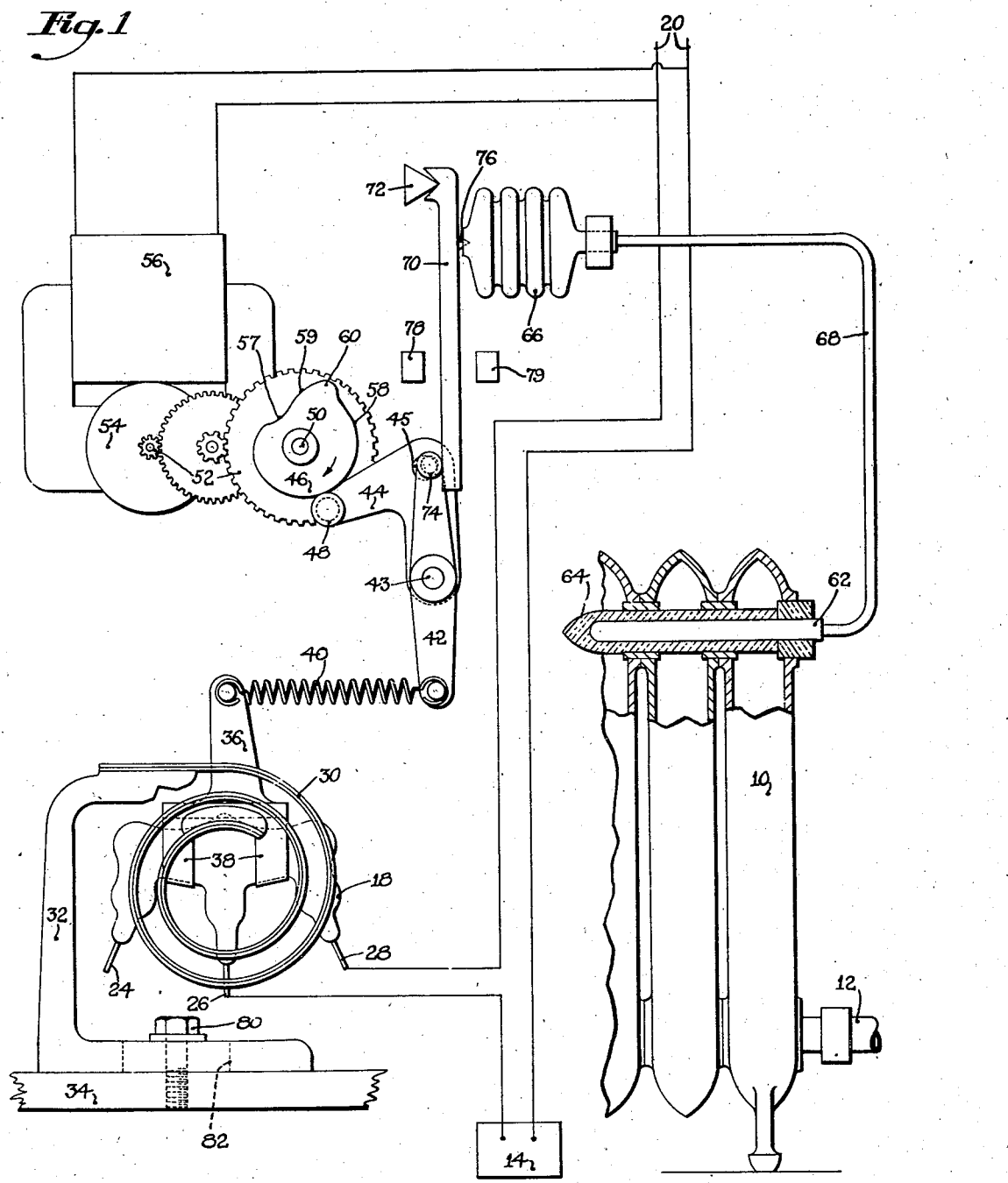

March 10, 1942. L. E. TOPHAM 2,275,928
TEMPERATURE CONTROLLING SYSTEM AND APPARATUS
Filed Aug. 16, 1933 4 Sheets-Sheet 2

March 10, 1942.  L. E. TOPHAM  2,275,928
TEMPERATURE CONTROLLING SYSTEM AND APPARATUS
Filed Aug. 16, 1933  4 Sheets-Sheet 3

Witness
H. Van Dine.

Inventor
Laurence E. Topham
by Fish Hildreth
Cary & Jenney Attys.

March 10, 1942. L. E. TOPHAM 2,275,928
TEMPERATURE CONTROLLING SYSTEM AND APPARATUS
Filed Aug. 16, 1933 4 Sheets-Sheet 4

Patented Mar. 10, 1942

2,275,928

UNITED STATES PATENT OFFICE 2,275,928

TEMPERATURE CONTROLLING SYSTEM AND APPARATUS

Laurence E. Topham, Wenham, Mass.

Application August 16, 1933, Serial No. 685,367

23 Claims. (Cl. 236—46)

The present invention relates to temperature controlling systems and apparatus for maintaining a fixed temperature within an enclosed space, such as within a dwelling house, having heat transmitting characteristics which change in an irregular manner with outside temperatures and with other variable conditions.

In many temperature controlling systems in general use, whether for heating or cooling apparatus, a temperature responsive element, usually a thermostatic switch is employed for operating some means to add or subtract heat when the temperature reaches certain predetermined limits. The general average of the temperatures within a heated space may, in this way, be maintained within these limits, but temporary fluctuations of temperature in excess of the limits still may take place. Such fluctuations are most troublesome when the amount of heat transferred between the enclosed space and the outside is relatively small compared to the heating or cooling capacity of the apparatus which acts to maintain the average temperature. These fluctuations in temperature are particularly noticeable in house heating systems during mild weather, taking the form of intermittent periods of excess heat and coolness occurring at a rate determined by the natural heat storing, transmitting and producing characteristics of the system.

This type of temperature regulation operates on the principle of a varying temperature, and consequently the temperature of the space in which the thermostatic switch is located is always rising or falling, depending on whether the supply of heat is on or off. As a result, there is an appreciable, noticeable, and often objectionable variation in the temperature of the heated space. With temperature controlling systems utilizing this type of temperature regulation, a wide variation in the temperature is unavoidable, being due to the principle on which the systems operate, to the fact that the thermostat tends to lag behind the actual change in the temperature of the heated space, and to the lag in the change of the rate at which the heat is supplied.

The objects of the present invention are to maintain a fixed stable or uniform temperature without temporary fluctuations within an enclosure and to minimize the effects of sudden irregular variations of temperature not under immediate control.

With these objects in view, the several features of the present invention have been embodied in a temperature control system comprising a thermally responsive member located in the enclosed space, the temperature of which is to be controlled, a heat control member such as an electric switch connected to the thermally responsive member, and means for periodically adjusting this thermostatic switch device progressively for operation through a limited range of temperatures. The switch is thus operated at a point in each period varying with variations in the temperature of the enclosed space, and consequently of the thermally responsive member. By the actuation of the thermostatic switch, the heat supply is turned on or off periodically and heat is supplied at regular intervals and in amounts sufficient to maintain the heated space at the temperature at which the thermostatic switch is actuated. The range of temperatures for which the thermostatic switch is adjusted extends from a point below to a point above the temperature at which it is desired to maintain the heated space, and the frequency or periodicity of the recurring adjustments is of such rapidity that little or no change in the temperature of the responsive element and of the enclosed space is to be expected between recurrences in the adjustment. The adjustment in the range of temperatures is preferably slowly upward during the greater part of each recurrent cycle with a rapid drop during the remainder of the cycle.

In the embodiment of the several features of the invention hereinafter described, the apparatus is intended to be so arranged that during the first part of the adjustment period, the thermostatic switch will be adjusted for operation at a temperature below that at which it is desired to maintain the heated space. During this part of the adjustment cycle, the heat control switch will be open. At some subsequent point in the adjustment cycle, the switch will become adjusted for operation at the temperature of the heated space and the heat control switch will close. If the temperature of the heated space falls, the control switch will be closed at an earlier point in the cycle and if the temperature of the heated space rises, the switch will be closed at a later point in the cycle. Heat will thus be delivered to the heated space at a rate to maintain a fixed, stable or uniform temperature without temporary fluctuations.

Certain features of the invention contemplate the provision of automatic means for adjusting the switch progressively for operation through a higher or lower range of temperatures upon a rise or drop in the temperature of the heated space for a considerable length of time. A change in the rate of heat delivery is thus effected which will maintain the heated space at a given temperature regardless of the rate at which heat is delivered to or dissipated from the heated space.

It is believed that the features of invention above referred to are broad and generic in character and, except as defined in the claims, are not to be limited to the specific construction and arrangement of parts illustrated in the drawings and hereinafter specifically described. As to certain features also, it is believed that the invention may be embodied in controlling systems other than those utilized for controlling the temperature of enclosed spaces, and may be utilized to control forces other than that exerted by heat.

Certain features of the invention also contemplate the provision of novel and improved systems for maintaining a fixed stable control of temperature with both the type of heater which is controlled by intermittently operating it at full-rated capacity, and in the type of heater in which the heat is controlled by a throttle, damper bypass or other gradual control device; of a novel improved temperature operated electrical switch, and of the devices, combinations and arrangements of parts hereinafter described and claimed, which together with the advantages obtained thereby will be understood by those skilled in the art from the following description taken in connection with the accompanying drawings.

Figure 2:
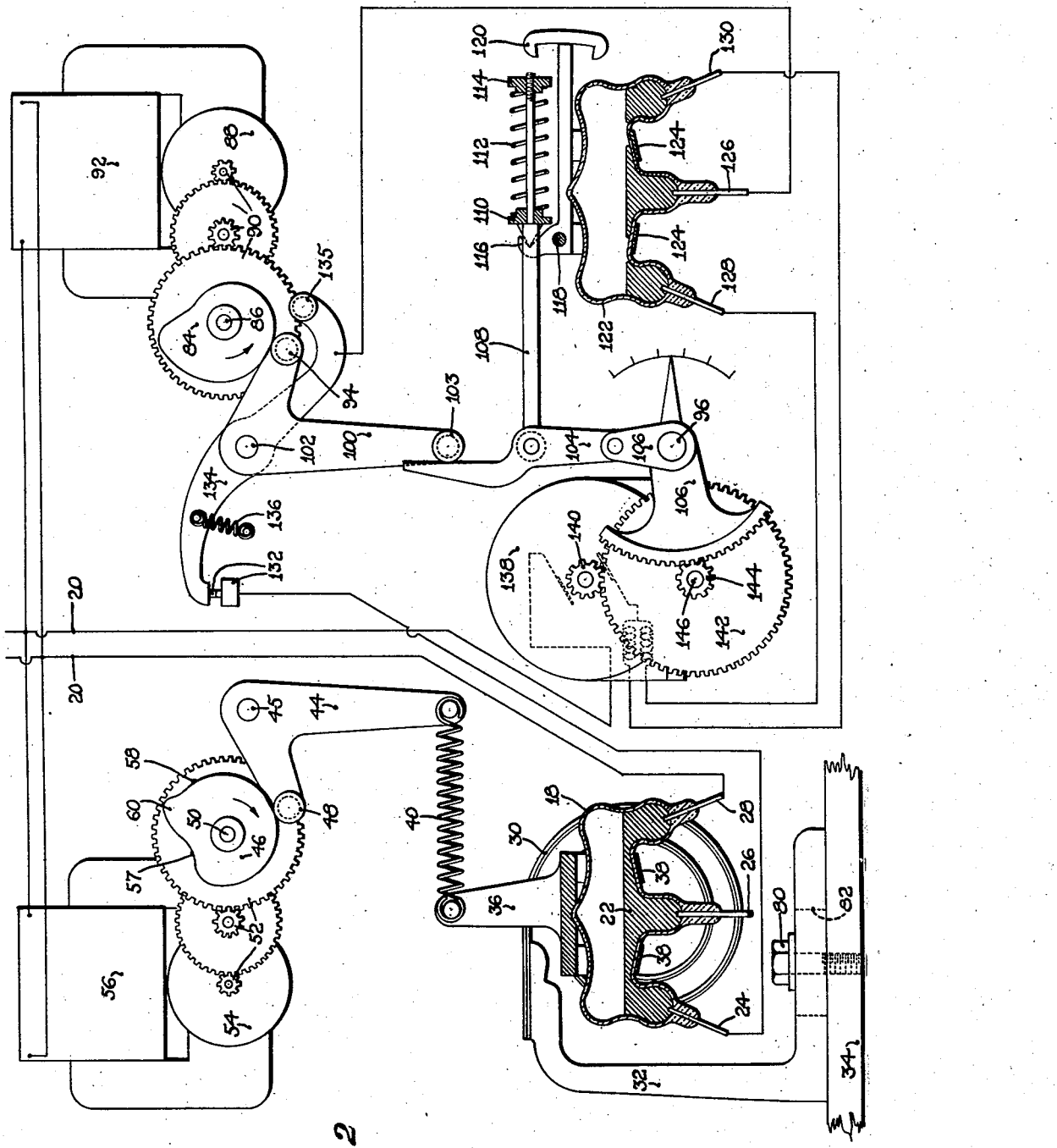
Figure 3:
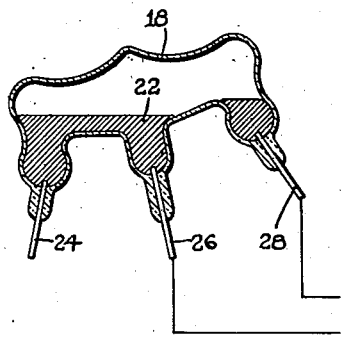
Figure 6:
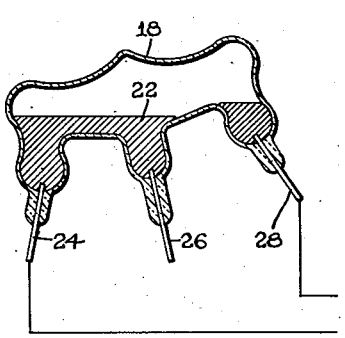
Figure 4:
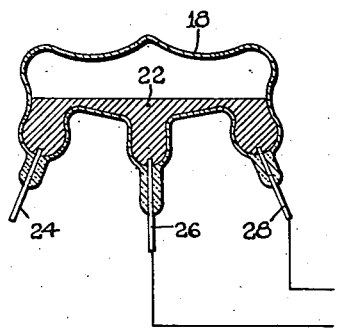
Figure 7:
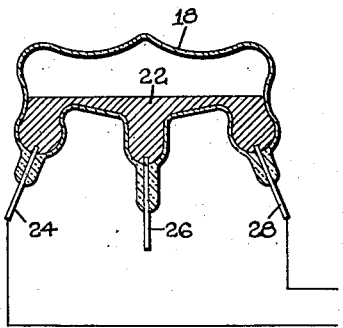
Figure 5:
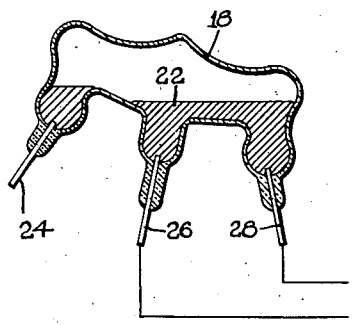
Figure 8:
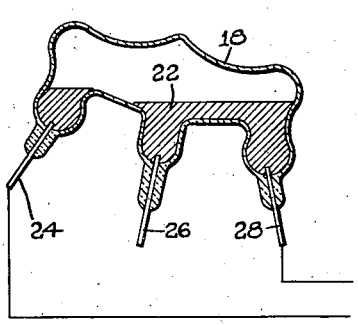
Figure 9:
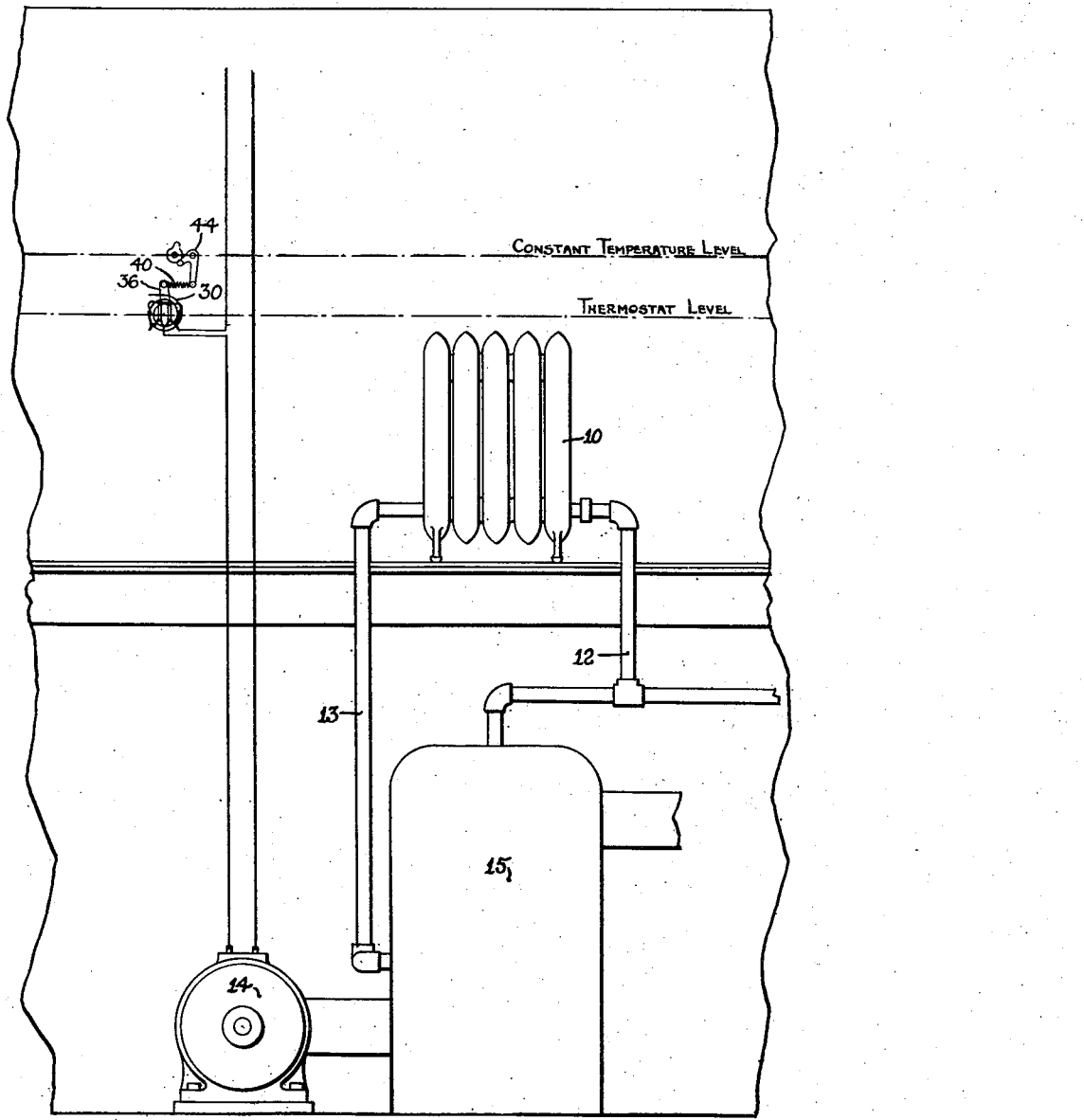

In the drawings Fig. 1 is a diagrammatic view of a heating system embodying certain features of the present invention as applied to a house heater arranged to be intermittently operated at full-rated capacity for controlling the temperature; Fig. 2 is a diagrammatic view illustrating features of the invention as applied to a house heater arranged to be controlled by a throttle, damper or other control member for changing the uniform rate of heat supply; Figs. 3, 4 and 5 are sectional views of a switch employed in the embodiment of the invention illustrated in Fig. 1, indicating different positions of the switch; Figs. 6, 7 and 8 are sectional views of a switch employed in the embodiment of the invention illustrated in Fig. 2; and Fig. 9 is a diagrammatic view illustrating an ordinary form of heating apparatus and indicating the height in a room at which applicant's thermostat may be located in order to cause a uniform temperature to be maintained at a higher level.

In the control system illustrated in the drawings, a timing device is employed for modifying the action of a temperature actuated switch, so that the temperature at which the switch will operate is continuously changed through a complete cycle at the end of which the switch is rendered inoperative to control the heater. The time periods of each cycle between the beginning of each inoperative interval of the switch preferably is made uniform, and in the subsequent periods in which the temperature of the heated space remains the same, the switch will be actuated after equal intervals of inoperativeness, while in the subsequent periods in which the temperature of the heated space is changed the intervals of time required before the switch is actuated will change to correspond.

For use with a heater arranged for intermittent operation at a uniform rate, control is effected by causing the switch when actuated to operate the heater, and when rendered inoperative, to cause the heater to remain idle. For use with a heater arranged to be controlled by a throttle, damper, by-pass or other gradual control means, a suitable translating device is employed which acts to periodically select that position at which the control is to remain, or to which it is moved and retained for approximately a full period. The actuation of the thermostatic switch at a particular time in the period causes the corresponding position of the control means to be assumed.

Referring more particularly to Fig. 1 of the drawings, the heater is indicated by a portion of a steam or hot water radiator 10 located within the space to be heated and connected by supply pipe 12 to a boiler or other source of heat supply. The heater is provided with suitable electrically controlled apparatus, indicated at 14 for supplying heat uniformly at full-rated capacity when a current passes through it. This apparatus may be constructed and arranged in a well known manner, as indicated in Fig. 9 which illustrates an oil burning apparatus comprising a motor driven blowing mechanism. The control circuit of apparatus 14 includes a control member in the form of a mercury switch 18 and the alternating current power supply mains 20.

The switch 18, as best shown in Figs. 3, 4 and 5, is of well known form comprising a tubular insulating container surrounding a quantity of mercury 22 and having a series of depressions into which are fitted contacts indicated at 24, 26 and 28. When the switch is rocked to raise the contact 24 at the left to the level of the contact 28 at the right (Fig. 4) a circuit will be completed between the central contact 26 and the contact 28, and when raised above the contact 28 (Fig. 5) the same circuit will continue. When the contact 28 is raised to a position above the contact 24 (Fig. 3) the connection between the contacts 26 and 28 is broken and an ineffective connection is established between contacts 26 and 24. To cause the application of heat, the contacts 26 and 28 are connected in series with apparatus 14, and thermally responsive means subject to the temperature of the heated space are employed for rocking the switch to complete the circuit between the power mains 20.

The temperature responsive means comprises a pair of coiled bi-metallic strips 30, of which one end of each is mounted on a bracket 32 supported on the base 34. The other ends of the bi-metallic strips 30 are connected to either side of a vertical arm 36 carrying at its lower portion a pair of clips 38 surrounding the switch 18 to support it in position. When the strips 30 are uncoiled, the switch is rocked in a counter-clockwise direction to disconnect the contacts 26 and 28, and when the strips 30 are coiled tighter the switch is rocked in the opposite direction to complete the circuit of the heater control 14, causing the delivery of heat in the manner previously described.

The periodic progressive adjustment of the thermally controlled switch, in the present embodiment of the invention, is accomplished by periodically extending and releasing a light tension spring 40, one end of which is connected to the arm 36 which carries the switch 18. The opposite end of the spring 40 is attached to a lever 42 pivotally mounted on a pin 43 carried by a bell-crank 44 having a fixed fulcrum 45. The spring 40 acts in a manner tending to rock the mercury switch 18 in a clockwise direction towards a position in which the circuit is closed between the contacts 26 and 28, but this movement is resisted by the coiled strips 30, the degree of resistance increasing with higher temperatures. The resiliency of the spring 40 and of the bi-metallic strips 30 are such that neither one will be strong enough to overbalance the other throughout the variation period, providing that the temperature is within the normal or control range.

The means for periodically extending and releasing the spring 40 comprises a cam 46 engaging a follower 48 mounted on one arm of the bell-crank 44. The cam 46 is rotated through 360 degrees, once during each period of time which may be selected as being most effective for the conditions under which the system is used. For most house heating systems periods of one-half hour are suitable.

To rotate the cam 46 it is mounted upon a shaft 50 operated by a reduction gear train 52 from a constant speed motor 54. This motor is preferably operated at a synchronous speed by current passing through a coil 56 connected to the alternating current mains 20, which are also used for operating the heat controls 14.

The cam 46 is properly shaped to cause the spring 40 to apply little or no force upon the arm 36 at the point of smallest radius, indicated at 57. The cam is rotated in the direction of the arrow, first to cause a quick rise for the purpose of imparting to the spring 40 a tension of twice the value necessary to rock the switch 18 against its friction and weight into a closed position, thus offsetting the loss of time incidental to the operation of the switch. The spring is then uniformly extended during the rotation of the cam until the highest point of the uniformly increasing portion 58 of the cam is reached. Thereafter, the spring 40 is placed under a further tension which is sufficient for operating the switch 18 to close the heat control circuit at a predetermined maximum temperature. The tension of the spring 40 is quickly released after the maximum tension by a relatively steep drop portion 59 of the cam 46, back again to the point of smallest cam radius.

Within each period of time required for the cam 46 to complete its rotation from the point 57 and return a progressive change is made in the temperature at which the thermostatic switch will be actuated. This is accomplished by increasing the tension of the spring 40, through a predetermined range, by the increasing radii of the rotating cam 46. At some point in the uniformly increasing portion 58 of the cam the tension of the spring 40 will exceed the resistance of the coiled strips 30 and the heater circuit will be closed for the remainder of the period. The exact point at which the closing of the switch occurs is dependent upon the resistance of the coiled strips 30, which in turn is dependent upon the temperature to which they are exposed. Thus the rotation period may be divided into two intervals, the relative lengths of which are unknown at the beginning of the period. During the first interval, which starts at the point 57 of the cam, and during which the heater is idle, a process of temperature inspection is taking place. The interval terminates when the resistance of the coiled strips 30 becomes inferior to the tension of the spring 40, or as might be said, the temperature has been ascertained. The duration of this interval increases with the higher temperatures, because higher temperatures increase the resistance of the coiled strips, thus requiring greater tension of the spring 40 and a greater radius of the cam to effect the operation, which occurs at a later time in the rotation period. The second interval, during which heat is applied, constitutes the remainder of the uniformly increasing portion 58 and the quick drop 59, terminating at the point 57. This might be termed the resultant heat applying interval, its duration being shorter for the higher temperatures.

The action of the elements described is so arranged that the intervals are constant during such times as the rate of heat loss is constant, but when the inspection interval becomes shorter, on the first indication by the coiled strips 30 of a loss in temperature, the heat will be applied for a longer interval, or at a higher average rate. In such case, the thermostatic switch is actuated at a temperature somewhat lower than that at which it is desired to maintain the heated space, and consequently the increase in the length of the heat interval will act to offset only partially the loss in temperature. In order to wholly offset this loss in temperature, means are provided in the system illustrated in the drawings for raising the range of temperatures through which the thermostatic switch is progressively adjusted after the longer heat application intervals have become definitely established. To accomplish this result, in the form of the invention illustrated in the drawings, a cylindrical container 62 having an expansible fluid therein is mounted within an opening in the radiator 10, at a position in which it may respond to average changes in temperature of the radiator. To insure that the temperature of the fluid within the container 62 represents an established average, said container is surrounded by an insulating shield 64. A movement is produced by changes of temperature in the container by a bellows 66 connected with the container through a tube 68 and arranged to operate a bar 70 cooperating with the lever 42 to which the spring 40 is connected. The bar 70 is notched at its upper end to engage a wedge shaped fulcrum 72 and acts at its lower end against a roll 74 on the upper arm of the lever 42, the spring 40 maintaining a projection 76 on the bar 70 against the free end of the bellows 66. Movement of the bar 70 is limited by fixed stops 78 and 79 arranged in the path of movement of the bar.

The device just described coordinates with the previously described device in the following manner. It has been shown that the previous apparatus increases the average rate at which heat is applied when the rate at which heat is dissipated increases, but at a lower temperature of the heated space. The increased average rate of heat application causes the average temperature of the heating medium to increase, thus in time expanding the fluid within the container 62, and expanding the bellows 66. The bar 70 is then moved against the roll 74 on the lever 42 and causes the spring 40 to be further extended. The effect of this greater extension of the spring is to cause the inferiority of the coiled strips 30 to appear at an earlier point in the rotation of the cam 46, with a consequent increase in the average rate of heat application. The intended effect of this increased application of heat is to cause a rise in the temperature of the heated space to a value midway between the temperatures quoted, so that the subsequent expansions, resulting from subsequent increases in the temperature of the heating medium, will diminish as the original temperature is approached.

The amount or magnitude of compensation produced by the above described devices responsive to radiator temperature must necessarily be very small, since the fall or "droop" in the average maintained temperature, which will be permitted by the first described apparatus alone, following an increase in the heating rate, amounts to only a degree or so over practically the whole range of outside temperature variation encountered during the heating season. Accordingly, the shift in the position of the bar 70, after the temperature of the container 62 has finally reached that of the average temperature of the heating medium upon an established change in the heating rate, need only be enough to increase the application of heat to a value such that the same desired temperature is maintained as before the change in the heating rate took place.

Furthermore, the temperature of the container 62 will be raised so slowly by reason of the insulation that the shift of the bar 70 will be exceedingly gradual, resulting in but a slight increase in length of each heating interval, as compared with the length of the corresponding intervals in case the first described apparatus alone were employed. By having this shift take place very gradually, and by having the magnitude of the ultimate shift not exceed the amount of the temperature "droop" which would otherwise result for the particular change in heat rate, the apparatus will gradually adjust itself to the new demands, with the bellows 66 expanded only in proportion to the new heating rate as determined by the average temperature of the heating medium.

The air in a room does not ordinarily have a uniform temperature from ceiling to floor, but decreases in temperature at a definite rate towards the floor along a fixed characteristic curve under like heating conditions. The extent of this decrease in temperature is greater when more heat is being supplied and dissipated.

Usually it is desirable to maintain a uniform fixed temperature at a level of about 5 feet from the floor, and the conventional thermostat is normally placed at this level. When a uniform fixed temperature is maintained at the 5 foot level, it will be apparent, in view of the facts above stated, that the temperatures at levels of less than 5 feet will fall when the rate of heat dissipation becomes greater, and will rise when the rate of heat dissipation becomes less.

As has been explained, applicant's heat control system, unless provided with means for adjusting the range of temperatures through which the thermostatic switch is actuated, tends to maintain the heated space at a lower temperature upon an increase in the rate of heat dissipation. A feature of the present invention contemplates utilizing this characteristic to maintain a uniform fixed temperature at any desired level. To accomplish this result, the thermostatic switch is planned at such a distance below the level at which the uniform temperature is desired that while the temperature at which the switch is actuated varies with the rise and fall of temperature at that level, the temperature at the higher level remains constant.

In any heating season there exists an irregular dividing line between those intervals requiring the application of heat and those intervals during which additional heat is not required. If the application of heat were to be discontinued when the temperature of the heated space barely exceeded its normal winter temperature, some discomfort would result, because of the fact that vertical air circulation ceases with the discontinuance of applied heat. This causes a stratified condition of the air within the previously heated space, sometimes referred to as "cold 70," which can be avoided only by delaying the time at which heat will be discontinued and advancing the time at which it will be resumed. It is obvious that, in the described apparatus, heat applications will be discontinued when the temperature of the heated space exceeds the highest value in the range of progressive adjustment of the thermostat, because of the inability of the spring 40 to overcome the greater resistance of the bimetallic coils 30 to rock the switch 18 in a clockwise direction. This condition may be prevented by increasing the cam radius at a point, as indicated at 60, the amount of resulting increased temperature being about two degrees Fahrenheit and the duration of the interval of increased radius being sufficient to cause the application of heat at the lowest average rate capable of causing an effective vertical circulation of the air within the heated space.

In order to initially regulate the operation of the system to maintain different temperatures, suitable adjustments may be effected, as with the usual types of temperature control switches. This is accomplished in the device shown by a sliding movement of the bracket 32 along the base 34 to which it is secured in position by a bolt 80 passing through a slot 82 in the bracket and into a threaded hole in the base.

When a heater having a throttle control member, a damper, by-pass or any other gradual control device is employed, a control system as illustrated in Fig. 2 is employed. Such a system involves the use of three mechanically separate units, usually remotely spaced from each other. The temperature responsive element, located in the heated space, is mechanically identical to the device previously described and is shown at the left of the figure. The temperature re-establishing element, located in the heating medium as at 62 in Fig. 1, is identical to the device previously described, but to simplify illustration has been omitted from Fig. 2, and the spring 40 connected directly to the bell-crank 44. The throttle operating unit is integral with the heater and is shown at the right of Fig. 2.

The circuit from one of the mains 20 through the switch 18 with this type of heater is completed in the same manner as has been described for the control of intermittently applied heat. The closed interval, however, is invariably of short duration. Although the movements of the switch 18 are identical in both cases, the short closed intervals are accomplished for the circuit to be described by the use of the outside terminals 24 and 28 of the switch. When the switch is rocked in a counter-clockwise direction, at the beginning of each period, the main body of the mercury 22 will separate from the part within the depression above the contact 28, as illustrated in Fig. 6. During the gradual adjustment of the thermostat, caused by the portion 59 of the cam 46, the switch 18 will be gradually rocked from the position shown in Fig. 6 in a clockwise direction and will reach the horizontal position shown in Figs. 2 and 7 at a time in the adjustment cycle depending on the temperature of the coiled strips 30. This completes the connection between contacts 24 and 28, but only momentarily, because the continued adjustment causes a further clockwise movement of the switch 18, which causes the main body of mercury to separate from that retained in the depression above the contact 24, as shown in Fig. 8, thus again opening the circuit.

As in the previously described device, the relation of the remaining time, referred to as the resultant interval, to the full period of rotation of the cam 46, represents the percentage of full capacity of the heater required to maintain a constant temperature. Throttle valve settings also represent percentages of full capacity of the heater which they control. Therefore any device which is capable of translating this resultant interval of time into angular positions of the throttle valve shaft would cause the delivery of that quantity of heat which is necessary to maintain temperature. One form of such a device is shown at the right portion of Fig. 2 and will now be described.

The particular instrument employed in the present form of the invention, comprises a rotating cam 84 mounted on a shaft 86, which is driven in the direction of the arrow at the same speed as the cam 46 through a gear train 90 by a constant speed motor 88. This motor is operated by current passing through a coil 92 connected to the alternating current mains 20 and at a speed synchronous with the coordinating motor 54, connected across the same mains. The cam 84 is so timed that a portion having a gradual increase in radius engages a follower 94 during that interval in which the portion 58 of the cam 46 engages the follower 48.

The cam follower 94 acts through a suitable electric relay to cause the throttle valve shaft indicated at 96 to take a series of positions indicative of percentages of heater capacity, and the cam 84 is so designed that during the slowly increasing portion, equal angles of rotation represent equal decreases in the percentage of total throttle position. The follower is mounted on the arm of a bell-crank 100 fulcrumed on the stationary pivot 102. This bell crank 100 carries at its lower extremity a roll 103 which engages the upper end of an equalizer bar 104. The lower end of the equalizer bar 104 is fulcrumed on the upper end of a bell-crank 106 attached to the throttle shaft 96 which operates the valve or any other gradual control device. These parts are so related that when the throttle valve shaft 96 and its bell-crank 106 are in that position which indicates a certain percentage of throttle capacity and the cam 84 is in the rotative position indicating the same percentage, the center of the equalizer bar 104 is invariably on the line connecting the shaft 96 and the pivot 102. This condition will appear twice during each rotation of the cam shaft 84, but means to be hereinafter described are provided whereby only that position caused by increasing radii of the cam is effective.

The mechanism which indicates the agreement or disagreement of the throttle valve position and the position of the cam 84 consists of a link 108 fulcrumed at one end to the center of the equalizer bar 104 and arranged to carry at its opposite end a slidable collar 110, pressed against a shoulder formed on the link by a compression spring 112, the reaction of which is taken by a nut 114 threaded on the link 108. The collar 110 is fitted with knife edges which engage corresponding notches formed in a bell-crank 116 which is free to rotate about a stationary fulcrum 118 to the extent of the limiting stop 120. The purpose of the spring 112 is to allow further movement of the link 108 to the left after the bell-crank 116 has engaged the stop 120.

The means for indicating the position of the throttle operating mechanism comprises a mercury switch 122 attached to the bell-crank 116 by means of clips 124. The container of the switch 122, unlike that of the switch 18, is provided with an insufficient amount of mercury to complete the circuit between any of its contacts when it is in the level position, as shown in Fig. 2. This level position occurs at the effective point in the revolution of the cam 84 when the position of the throttle valve shaft 96 agrees with the timing of the follower 94 with the cam 84. At all points of disagreement the mercury switch 122 is rocked in either a clockwise or counterclockwise direction, thus completing a circuit between the central contact 126 of the switch and either contact 128 or contact 130.

During that interval in the period of rotation of the cam 84 during which the follower 94 engages the series of increasing radii of the cam, the central contact 126 of the switch 122 connects with the contact 24 of the switch 18 (remotely located in the heated space), but there is interposed in this connection a pair of contacts 132, one of which is stationary, the other being carried by a lever 134 fulcrumed on the pivot 102 and provided on one arm with a follower 135 which engages the cam 84. The contacts 132 are maintained in a closed condition by a spring 136, but the contacts are opened by the engagement of the follower 135 with the cam 84 during the interval in which the follower 94 engages the series of decreasing radii of the cam 84, thus causing the switch 122 to be ineffective during the remainder of this interval.

The end contacts 128 and 130 of the switch 122 are connected to a reversible motor 138 which is connected directly to one of the power mains 20. The action of current passing through the motor is to cause its rotation in a direction dependent upon whether contact 128 or 130 connects with the center contact 126 of the switch 122. The mechanical connection of this motor to the throttle valve shaft 96 consists of a pinion 140 on the motor shaft engaging the gear 142 integral with a pinion 144 and rotating about the fixed shaft 146. The pinion 144 engages a gear segment formed on the bell-crank 106 attached to the throttle valve shaft 96.

Because of the connection between one of the power mains 20 and the contact 28 of the switch 18 it is obvious that rotation of the motor 138 is possible during the short interval during which the switch 18 is in the level position, indicated in Fig. 7, and during which portions of increasing radii of the cams 46 and 84 engage their respective followers 48 and 94. Whether or not rotation occurs at this time is dependent upon the position of the switch 122. If the switch 122 is in the level position, indicated in Fig. 2, at this time due to an agreement in the percentage of heater capacity indicated by the throttle valve shaft 96 and the cam 84, no rotation of the motor will occur and the possibility of rotation will be delayed for substantially a full period of rotation of the cams 46 and 84. This condition will prevail when the rate of heat dissipation is constant, the inward transfer of heat balancing the outward transfer. The first indication of an increase in the rate of outward transfer of heat will be a lower temperature of the heated space and of the coiled strips 30. As previously described, this will cause the switch 18 to reach the position shown in Fig. 7 at an earlier time in the rotation of the cams 46 and 84. At this point the switch 122 will not have reached the level position, in which it is shown, but will be depressed at its right or outer end. In this position, the supply of mercury will connect the terminals 126 and 128, thus completing the circuit through the motor 138, causing it to rotate in a counter-clockwise direction. This rotation of the motor will cause a rotation of the throttle valve shaft 96 in a counter-clockwise direction, thus moving the lower end of the equalizer 104 to the left about the roll 103 as a fulcrum. This carries the link 108 to the left and causes the rocking of the switch 122 in a counter-clockwise direction until it reaches the level position. This will open the motor circuit and the parts will remain in this new position for at least one approximate rotation of the cam 84, but the amount of heat applied during the following period will be greater than during the preceding period because of the rotation of the throttle valve shaft 96 in a counter-clockwise direction. This process accomplishes in effect a periodic inspection of the temperature of the heated space, combined with an adjustment of the throttle valve tending to offset the changes in temperature indicated.

The changes in temperature may be wholly offset after an interval of time by the use of the cylindrical container 62 in the form of the invention illustrated in Fig. 1, which container is mounted within the radiator 10, and operates as hereinbefore described.

To maintain temperatures below a predetermined point, as in refrigerators, the action of the bi-metallic strips 30 is reversed so that they will uncoil when the temperature falls and the controls 14 or the throttle shaft 96 are arranged to effect the operation of a motor or valve, respectively, which governs the circulation of a cooling medium through the radiator. It is also within the scope of the invention to reverse the rotation of the cams illustrated, so that there will be a quick movement of the followers away from the cam shafts and a gradual returning movement towards the shafts on which the cams are mounted. In this instance, the heat transferring apparatus will operate during the first interval of each period and be idle during the second interval.

The nature and scope of the invention having been indicated and an embodiment of the invention having been specifically described, what is claimed is:

1. A control system comprising a movable control member, means for subjecting said member to a force to be controlled, means for subjecting said member to a force varying periodically at a predetermined frequency below and above limits sufficient to actuate said member, and means controlled by the movements of said member produced by said forces for regulating the force to be controlled.

2. A control system comprising a movable control member, means for subjecting said member to a force to be controlled, means for subjecting said member to a force varying periodically at a predetermined frequency to move said member at a time during each period varying with variations in the force to be controlled, and means for regulating the force to be controlled in accordance with the time in each period at which said member is moved by the action of said forces.

3. A control system comprising a thermally responsive member, a control member, and means acting periodically at a predetermined frequency to exert a varying force on said thermally responsive member and cooperating therewith to actuate the control member at times during each period varying wtih variations in the temperature of the thermally responsive member.

4. A control system comprising a thermally responsive member, a control electric switch connected thereto, a spring acting on said member, and means acting on the spring periodically to vary the tension of said spring to cause the switch to be actuated at a point in each period, varying with variations in the temperature of the thermally responsive member.

5. A control system comprising a thermally responsive member, a control electric switch connected thereto, a spring acting on said member, and a cam acting on the spring to vary the tension of said spring periodically to cause said switch to be actuated at a point in each period varying with variations in the temperature of the thermally responsive member.

6. A control system comprising a thermally responsive member, a control electric contact connected thereto, and means for subjecting said member to a periodically increasing force to close said contact at times during each period varying with variations in the temperature of the thermally responsive member.

7. A control system comprising a movable control electric switch, means for subjecting said switch to a force to be controlled, a spring acting on said switch, and means acting on the spring periodically to vary the tension of said spring to cause the switch to be actuated at a point in each period varying with variations in the force to be controlled.

8. A control system comprising a movable control electric switch, means for subjecting said switch to a force to be controlled, a spring acting on said switch, and a cam acting on the spring to vary the tension of said spring periodically to cause said switch to be actuated at a point in each period varying with variations in the force to be controlled.

9. A control system comprising a thermally responsive member, a control electric switch, means cooperating with the thermally responsive member for actuating said switch periodically, and at a point in each period varying with variations in the temperature of the thermally responsive member, mechanism for controlling the rate of a continuous and uniform heat supply, and means for rendering said mechanism operative upon a variation in the point in the period at which said switch is actuated to vary correspondingly the rate of heat supplied.

10. A control system comprising a thermally responsive member, a heat control electric switch, means cooperating with the thermally responsive member for actuating said switch periodically, and at a point in each period varying with variations in the temperature of the thermally responsive member, throttle actuating mechanism, and means for rendering said throttle actuating mechanism operative upon a variation in the point in the period at which said switch is actuated to move the throttle an amount corresponding to the amount of said variation.

11. A control system comprising a thermally responsive member, a heat control electric switch, means cooperating with the thermally responsive member for actuating said switch periodically, and at a point in each period varying with variations in the temperature of the thermally responsive member, mechanism for controlling the rate of a continuous and uniform heat supply, and means for rendering said mechanism operative upon a variation in the point in the period at which said switch is actuated to produce a change in the rate of heat supply.

12. A control system comprising a thermally responsive member and an electric switch, means comprising a cam cooperating with said thermally responsive member for actuating said switch periodically and at a time during each period varying with variations in the temperature of the thermally responsive member, a second electric switch, mechanism comprising a cam for actuating said last mentioned switch in synchronism with said first mentioned switch, mechanism for controlling the rate of a continuous and uniform heat supply, means acting upon a lack of synchronism in said switches to render said rate controlling mechanism operative to vary the rate of heat supply, and means actuated by said controlling mechanism for restoring the synchronism of said switches.

13. A control system comprising a thermally responsive member and an electric switch, means cooperating with said thermally responsive member for actuating said switch periodically and at a time during each period varying with variations in the temperature of the thermally responsive member, a second electric switch, mechanism for actuating said last mentioned switch in synchronism with said first mentioned switch, mechanism for controlling the rate of a continuous and uniform heat supply, means acting upon a lack of synchronism in said switches to render said rate controlling mechanism operative to vary the rate of heat supply, and means actuated by said controlling mechanism for restoring the synchronism of said switches.

14. A control system comprising mechanism including a reversible electric motor for controlling the rate of a continuous and uniform heat supply, a circuit for the motor, a thermostat, a time operated switch in the motor circuit controlled by the thermostat, a time operated reversing switch in the motor circuit, means actuated by the rate controlling mechanism for controlling the reversing switch, said switches being arranged to close a circuit through the motor in one direction upon a rise in the temperature within the heated space, and to close a circuit through the motor in the opposite direction upon a fall in the temperature in the heated space.

15. A control system comprising mechanism including a reversible electric motor for controlling the rate of a continuous and uniform heat supply, a thermally responsive member, an electric switch in the motor circuit, means cooperating with said thermally responsive member for autuating said switch periodically and at a time during each period varying with variations in the temperature of the thermally responsive member, a reversing switch in the motor circuit, means for actuating said reversing switch in synchronism with the first mentioned switch, said switches being arranged to close a circuit through the motor in one direction when the first mentioned switch lags behind the reversing switch, and to close a circuit through the motor in the opposite direction when said first mentioned switch runs ahead of the reversing switch, and means actuated by the controlling mechanism for bringing said switches into synchronism.

16. In a control system for maintaining a uniform temperature at a fixed predetermined level within an enclosed space having, in combination, heat transferring apparatus within the space, a thermostat located below the level of the point at which the uniform temperature is desired, and a control system connecting the thermostat and the heat controlling apparatus arranged to cause the heat transferring apparatus to produce a higher temperature at the level of the thermostat when a small amount of heat is transferred and a lower temperature at the level of the thermostat when a large amount of heat is transferred.

17. In a control system for maintaining in a space a substantially uniform temperature in the vicinity of the conventional five foot level despite inherent variations in vertical temperature gradient by reason of changes in heat dissipation, a thermostat for controlling the admission of heat to the space having temperature-droop characteristics at increased heat rates, said thermostat being positioned below said conventional level a distance such that the inherent change of temperature at the thermostat level as the heat dissipation changes is substantially equal to the temperature droop characteristics of said thermostat for the same change in heat dissipation.

18. A control system for regulating the temperature within an enclosed space, having, in combination, heat transfer apparatus, means comprising a thermostatic switch responsive to the space temperature and in control of the heat transfer apparatus, means cooperating with said thermostatic switch to cause the transfer of heat to take place at a lower rate upon a rise in temperature of the space and at a higher rate upon a fall in said temperature and thereby operative to maintain the space temperature, with a minimum of hunting, at values higher for low rates of heat transfer and lower for high rates of heat transfer, and means operative, after a lapse of time, upon a change in the average rate of heat transfer, to adjust the thermostatic switch so as to cause a further change in the rate of heat transfer in the same direction, thereby to minimize changes in space temperature due to changes in the rate of heat transfer.

19. A control system for maintaining a predetermined temperature within an enclosed space, having, in combination heat transfer apparatus, means comprising a thermostatic switch responsive to space temperature and in control of the heat transfer apparatus, periodically operating means cooperating with said thermostatic switch to cause the transfer of heat to take place at a lower rate upon a rise in temperature of the space and at a higher rate upon a fall in said temperature and thereby operative to maintain the space temperature, with a minimum of hunting, at values higher for low rates of heat transfer and lower for high rates of heat transfer, and means responsive to changes in the rate of heat transfer and operative, after a lapse of time, upon a change in the average rate of heat transfer, to adjust the thermostatic switch so as to cause a further change in the rate of heat transfer in the same direction, thereby to minimize changes in space temperature due to changes in the rate of heat transfer.

20. A control system for regulating the temperature within an enclosed space having, in combination, heat transfer apparatus, means comprising a thermostatic switch responsive to the space temperature and in control of the heat transfer apparatus, means cooperating with said thermostatic switch to cause the transfer of heat to take place at a lower rate upon a rise in temperature of the space and at a higher rate upon a fall in temperature and thereby operative to maintain the space temperature, with a minimum of hunting, at values higher for low rates of heat transfer and lower for high rates of heat transfer, and thermally responsive means adjacent the heat transfer apparatus and operative upon a change in the average rate of heat transfer over a considerable period of time to adjust the thermostatic switch so as to cause a further change in the rate of heat transfer in the same direction, thereby to minimize changes in space temperature due to the changes in the rate of heat transfer.

21. A control system for regulating the temperature within an enclosed space having, in combination, heat transfer apparatus, means comprising a thermostatic switch responsive to the space temperature and in control of the heat transfer apparatus, means cooperating with said thermostatic switch to cause the transfer of heat to take place at a lower rate upon a rise in temperature of the space and at a higher rate upon a fall in temperature and thereby operative to maintain the space temperature, with a minimum of hunting, at values higher for low rates of heat transfer and lower for high rates of heat transfer, and thermally responsive means adjacent the heat transfer apparatus and operative to adjust the thermostatic switch in a direction to increase the rate of heat transfer upon a temperature increase in the vicinity of said means, and to lower the rate of heat transfer upon a decrease in temperature in the vicinity of said means, and thermal insulation intermediate said means and the heat transfer apparatus whereby a change in the average temperature of said apparatus will, after a lapse of time, cause said thermally responsive means to adjust the thermostatic switch to further change the rate of heat transfer, thereby to minimize changes in space temperature due to changes in the rate of heat transfer.

22. A temperature control system comprising a thermally responsive member, a control switch, means cooperating with said thermally responsive member for periodically actuating the switch at a time during each period varying proportionally with respect to the departure of the temperature from a predetermined value, mechanism for controlling the rate of a continuous and uniform heat supply, and means operative upon a variation in the time in the period at which said switch is actuated to adjust said mechanism to cause heat to be supplied at a rate proportional to the said departure of the temperature from the predetermined value.

23. A control system for regulating the temperature within an enclosed space having, in combination, heat transfer apparatus, means in control of the heat transfer apparatus comprising a thermal element responsive to the space temperature and cooperating means for causing the transfer of heat to take place at a lower rate upon a rise in temperature of the space and at a higher rate upon a fall in said temperature whereby the space temperature is maintained at values higher for low rates of heat transfer and lower for high rates of heat transfer, and means operative after a lapse of time upon a change in the average rate of heat transfer to adjust the means in control of the heat transfer apparatus so as to cause a further change in the rate of heat transfer in the same direction and thereby minimize changes in the maintained temperature of the space due to changes in the rate of heat transfer.

LAURENCE E. TOPHAM.